United States Patent
Daoud

[19]

[11] Patent Number: 6,025,557
[45] Date of Patent: Feb. 15, 2000

[54] APPARATUS FOR MOUNTING CABLES

[75] Inventor: Bassel Hage Daoud, Parsippany, N.J.

[73] Assignee: Lucent Technologies Inc., Murray Hill, N.J.

[21] Appl. No.: 09/159,002

[22] Filed: Sep. 23, 1998

Related U.S. Application Data

[63] Continuation of application No. 08/707,883, Sep. 9, 1996, Pat. No. 5,886,298.

[51] Int. Cl.⁷ ...................................................... H02G 3/18
[52] U.S. Cl. ................ 174/65 G; 174/65 R; 174/152 G; 174/153 G; 16/2.1; 248/56; 439/471
[58] Field of Search ............................ 174/65 G, 65 SS, 174/65 R, 153 G, 153 R, 152 G, 151, 31 R, 35 GC; 248/56; 16/2.1; 439/471

[56] References Cited

U.S. PATENT DOCUMENTS

| | | | |
|---|---|---|---|
| 1,316,218 | 9/1919 | Bloomer | 174/59 |
| 2,324,791 | 7/1943 | McLoughlin et al. | 220/3.8 |
| 2,924,639 | 2/1960 | Zelt | 174/59 |
| 4,403,106 | 9/1983 | Lask et al. | 174/59 |
| 4,704,499 | 11/1987 | Faust | 174/92 |
| 5,499,823 | 3/1996 | Fukui | 277/314 |
| 5,774,934 | 7/1998 | Fujita et al. | 16/2.1 |

FOREIGN PATENT DOCUMENTS

| | | | |
|---|---|---|---|
| 0278544 | 8/1988 | European Pat. Off. | 174/65 G |
| 2269945 | 2/1994 | United Kingdom | 174/65 G |

*Primary Examiner*—Kristine Kincaid
*Assistant Examiner*—Dhiru R Patel

[57] ABSTRACT

Disclosed is apparatus for mounting a cable within an electronics enclosure, such as a network interface unit, which includes a splice chamber. A recessed portion is formed in one surface of the chamber, and a tie bar is formed across the recessed portion to provide a gap. A tie wrap is threaded through the gap and tightened around the cable to secure it to the surface. A grommet can also be mounted at the opening to the chamber. The grommet is made of a compliant material which has a series of perforations defining a plurality of non-concentric circles, and a series of perforations defining radial lines. A number of circles can be removed approximating the diameter of the cable, and segments formed by the radial lines can be used as flaps to prevent dust or other undesirable material from entering the chamber.

19 Claims, 2 Drawing Sheets

APPARATUS FOR MOUNTING CABLES

This application is a continuation of Ser. No. 08/707,883 filed on Sep. 9, 1996, now patent on Mar. 23, 1999 U.S. Pat. No. 5,886,298.

FIELD OF THE INVENTION

This invention relates to telecommunications apparatus.

BACKGROUND OF THE INVENTION

Network interface units constitute the demarcation between the customer's equipment and a telecommunications network. In buildings including multiple subscribers, the interface unit is typically mounted in a basement and includes an array of customer bridges, each bridge being coupled to an individual subscriber's line. The bridges are coupled to the network through an RJ11 jack and plug so that the customer can plug a working phone into the jack to determine if any problem lies in the customer or network side of the telecommunications system. Network interface units also typically include a building entrance protector portion which comprises a cable splice chamber and a protector field for providing surge protection for each customer. (For an example of a network interface unit, see U.S. Pat. No. 5,363,440 issued to Daoud).

In the splice chamber, it is usually desirable to provide strain relief for the incoming cable to prevent damage thereto. Standard brackets for holding the cable are effective, but expensive. It is also desirable to provide a grommet at the entry point of the cable in order to prevent the entry of pests or dust into the unit and prevent fire from escaping the splice chamber. A typical grommet comprises a compliant material with a series of perforations in the shape of concentric circles which can be cut out to define an opening according to the size of the cable. (See, U.S. Pat. No. 4,704,499 issued to Faust, and U.S. Pat. No. 4,988,834 issued to Birch.)

SUMMARY OF THE INVENTION

The invention is an apparatus for mounting a cable within an electronic enclosure having a splice chamber. The chamber includes a surface and an opening for receiving the cable. A recessed portion is formed in the surface in close proximity to the opening. A tie bar is formed across the recessed portion to form a gap therebetween, the gap being sufficient for insertion of a tie wrap or hose clamp which is capable of securing the cable. The opening may be covered by a grommet made of a compliant material with perforations defining non-concentric circles of increasing diameter in the material. The perforations also include a series of radial lines defining segments which, upon removal of at least one of said circles, form flaps in the material adjacent an aperture formed by the removal.

BRIEF DESCRIPTION OF THE FIGURES

These and other features of the invention are delineated in detail in the description to follow. In the drawing.

It will be appreciated that, for purposes of illustration, these figures are not necessarily drawn to scale.

DETAILED DESCRIPTION

Figure 1:
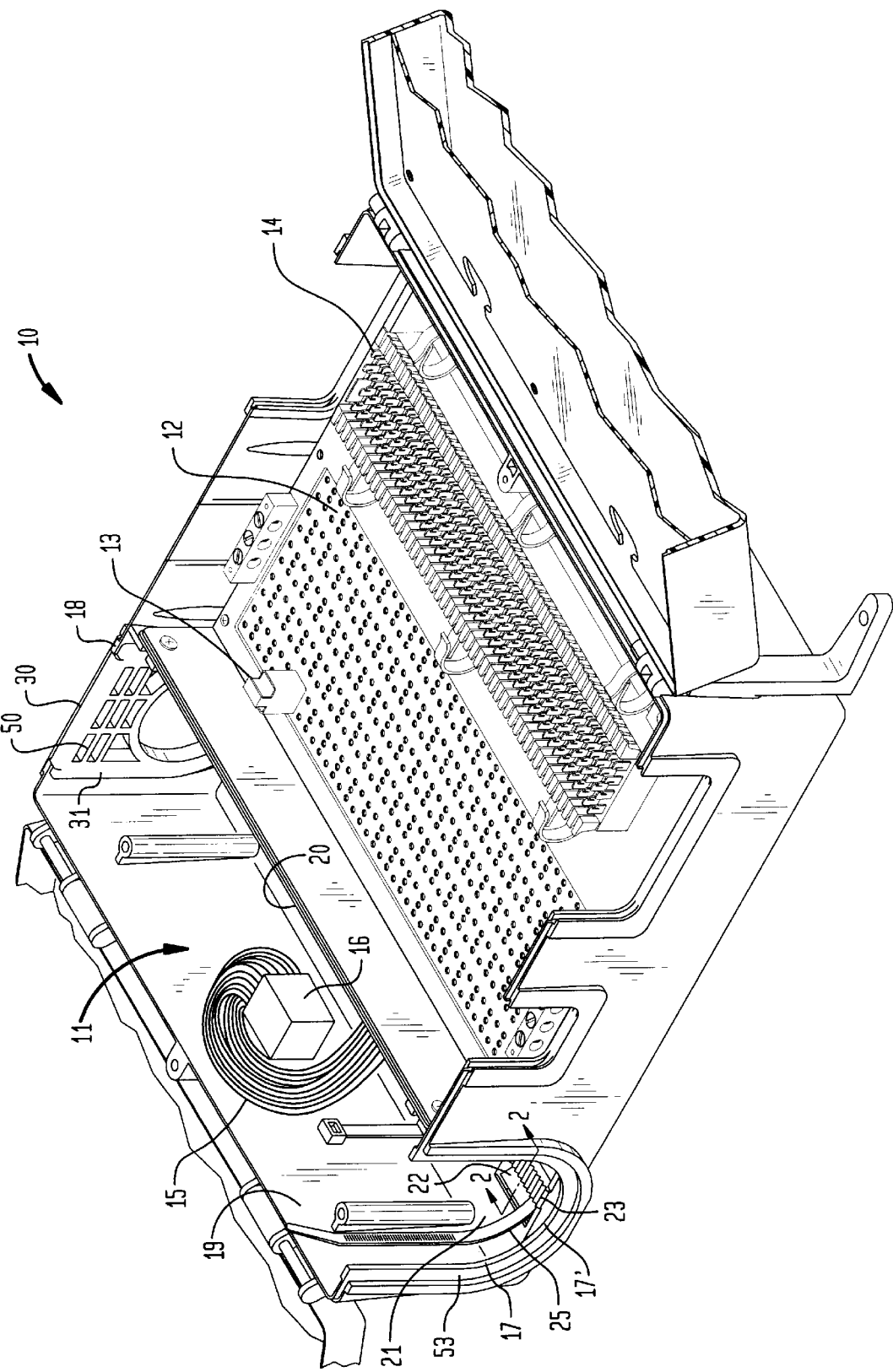
FIG. 1 is a perspective view of a portion of a network interface unit in accordance with an embodiment of the invention.
Figure 2:
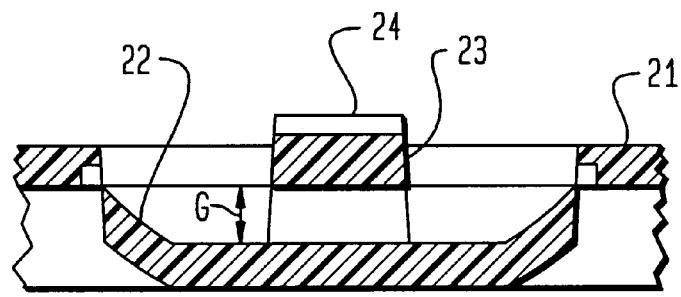
FIG. 2 is a cross sectional view taken along line 2—2 of FIG. 1.

Referring now to the drawings, in which like reference numerals identify similar or identical elements, FIG. 1 illustrates a portion of a network interface unit, 10, which embodies the present invention. Specifically, FIG. 1 shows the bottom layer of a two-layer design, where the bottom layer includes a splice chamber, 11, a plug-in socket field, 12, for mounting protectors, e.g., 13, and a cross-connect field, 14. The array of protectors are electrically coupled to a bundle of wires, 15, which terminate in a splice connector, 16. The splice chamber, 11, includes at least one, and preferably two, ports or openings, 17 and 18, for permitting ingress and egress of the telecommunications cable (not shown). Opening 17 includes a base 17' for supporting a cable in alignment with a supporting portion of the bottom of the splice chamber 11 as discussed further below. (For more details of a network interface unit, see U.S. Pat. No. 5,363,440, cited above, and incorporated by reference herein.)

The splice chamber, 11, is defined by two side walls, 19 and 20, and a bottom surface, 21. Adjacent to each port, e.g., 17, is a recessed portion including an arcuate surface, 22, which is formed in the bottom surface, 21. Shaped across the recessed portion is a tie bar, 23, which forms a gap, G, with the arcuate surface, 22. The gap, G, is sufficient to allow a tie wrap, 25, to be threaded therethrough, i.e., a dimension typically in the range 12 mm to 58 mm. The tie bar, 23, and recessed portion are preferably formed integrally with the bottom surface, 21. The tie bar, 23, preferably includes a series of sharp projections, 24, which provide a gripping surface for the cable.

Thus, a cable entering or exiting the ports, 17 or 18, is supported by the base 17' and can be secured to the bottom surface, 21, by wrapping the tie wrap, 25, around the cable and tightening according to the diameter of the cable. The combination tie wrap and tie bar, 23, thus provides strain relief for the cable at minimal expense.

Figure 3:
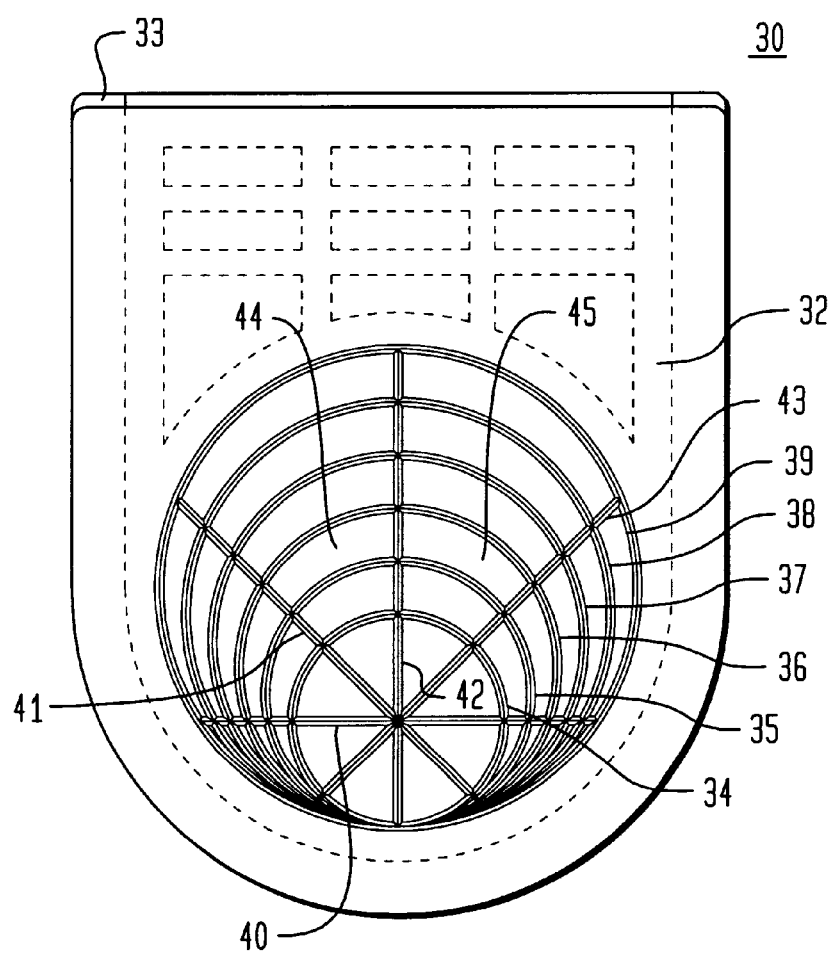
FIG. 3 is a frontal view of a grommet which may be included in the network interface unit of FIG. 1.

In accordance with a further feature of the invention, grommets, e.g., 30, are provided at the ports, e.g., 18. (In FIG. 1, only a single grommet is shown for purposes of illustration, but it will be realized that an identical grommet would be provided at port 17.) Reference is also made to FIG. 3 which illustrates the face of the grommet, 30, opposite to that shown in FIG. 1. The grommet includes a frame, 31, typically made of plastic, which supports a compliant material, 32, typically made of polyvinyl chloride. The frame, 31, and the compliant material, 32, are preferably the same material. However, the frame, 31, is made stiffer due to the material thickness and the confirguration of the struts, 50. The frame, 31, and compliant material, 32, are separated by a slot, 33. The grommets may be inserted by sliding the slot over a flange (see, e.g., 53, at port 17) at the entrance to the ports.

As best seen in FIG. 3, most of the compliant material, 32, includes a series of perforations in the shape of non-concentric circles, 34–39, having increasing diameters and a common portion near the bottom of the compliant material, 32. In a typical example, the smallest circle, 34, would have a diameter of 2.54 cm (1 inch) and each succeeding circle would have a diameter which increases by 0.64 cm (0.25 inches). Further perforations are provided in the form of radial lines, in this example, four such lines designated 40–43, which pass through the center of the smallest circle, 34, and extend essentially the full distance occupied by the circles, 34–39. Since four lines are provided in this example, it is convenient to have the lines at 45 degree angles to the adjacent lines. It will be appreciated that the angles and the number of lines can be varied, but preferably there should be at least two radial lines. The radial lines, 40–43, divide the circles into segments, e.g., 44 and 45.

When it is desired to introduce or exit a cable from the splice chamber, 11, the appropriate circular perforations can be cut to remove a number of circles defined thereby depending upon the diameter of the cable. For example, if the cable has a diameter greater than 3.2 cm (1.25 inches), but less than 3.8 cm (1.50 inches), the circles defined by perforations 34 and 35 will be removed to provide the appropriate sized hole. The portion of the radial lines, 40–43, between perforations 35 and 36 are then cut so that the segments, e.g., 44 and 45, defined by the radial lines can now act as flaps to plug the space which would have been present between the cable and the perforation 36. Thus, the presence of radial lines, 40–43, ensures an effective barrier against dust entering the splice chamber regardless of the size of the cable.

The invention claimed is:

1. Apparatus for mounting a cable within an electronics enclosure comprising:

a splice chamber having an opening for receiving the cable; and a grommet mounted in the opening, the grommet comprising a compliant material including a series of perforations defining non-concentric circles of increasing diameter in the material and radial lines defining segments which, upon removal of at least one of said circles, form flaps in the material adjacent an aperture formed by the removal.

2. Apparatus according to claim 1 wherein the compliant material comprises polyvinyl chloride.

3. Apparatus according to claim 1 wherein the grommet further comprises a frame for holding the compliant material.

4. Apparatus according to claim 3 wherein the frame includes a slot for sliding the grommet on a flange at the opening.

5. Apparatus according to claim 1 wherein the circles have a common portion near a bottom surface of the grommet.

6. The apparatus of claim 1 wherein the grommet further comprises a frame which supports the compliant material, said frame being stiffer than the compliant material.

7. The apparatus of claim 6 wherein the frame is thicker than the compliant material.

8. The apparatus of claim 6 wherein the frame and the compliant material are separated by a slot which slides over a flange located on the opening for receiving the cable.

9. The apparatus of claim 6 wherein the opening for receiving the cable is U-shaped and the frame has an outer portion which is U-shaped to slidably engage the U-shaped opening.

10. The apparatus of claim 6 wherein the frame is stiffer than the compliant material at least in part as a result of a configuration of struts included in the grommet.

11. The apparatus of claim 6 wherein the splice chamber houses a plug-in socket field for mounting an array of protectors and a cross-connect field, the apparatus further comprising an array of protectors, said array of protectors being electrically coupled to a bundle of wires which terminate in a splice connector.

12. Apparatus for mounting a cable within an electronics enclosure of a network interface unit comprising:

a splice chamber having an opening for receiving the cable, the opening having a base for supporting the cable in alignment with a supporting portion of a bottom of the splice chamber; and a grommet mounted in the opening, the grommet comprising a compliant material including a series of perforations defining non-concentric circles of increasing diameter in the material and radial lines defining segments which, upon removal of at least one of said circles, form flaps in the material adjacent an aperture formed by the removal, the circles having a common portion near a bottom surface of the grommet and located adjacent the base of the opening.

13. The apparatus of claim 12 wherein the grommet further comprises a frame which supports the compliant material, said frame being stiffer than the compliant material.

14. The apparatus of claim 13 wherein the frame is thicker than the compliant material.

15. The apparatus of claim 13 wherein the frame and the compliant material are separated by a slot which slides over a flange located on the opening for receiving the cable.

16. The apparatus of claim 13 wherein the opening for receiving the cable is U-shaped and the frame has an outer portion which is U-shaped to slidably engage the U-shaped opening.

17. The apparatus of claim 13 wherein the frame is stiffer than the compliant material at least in part as a result of the inclusion of a configuration of struts in the grommet.

18. The apparatus of claim 13 wherein the splice chamber houses a plug-in socket field for mounting an array of protectors and a cross-connect field, said array of protectors being electrically coupled to a bundle of wires which terminate in a splice connector.

19. Apparatus for mounting a cable within an electronics enclosure comprising:

a splice chamber having an opening for receiving the cable; and a grommet mounted in the opening, the grommet comprising a compliant material including a series of perforations defining non-concentric circles of increasing diameter in the material and radial lines defining segments which, upon removal of at least one of said circles, form flaps in the material adjacent an aperture formed by the removal, the grommet further comprising a frame which supports the compliant material, said frame being stiffer than the compliant material, at least in part as a result of the inclusion of a configuration of struts in the grommet.

* * * * *